United States Patent [19]

Momma et al.

[11] Patent Number: 5,346,163
[45] Date of Patent: Sep. 13, 1994

[54] POWER SUPPLY REGULATION SYSTEM FOR A RAILWAY

[75] Inventors: Naoko Momma; Korefumi Tashiro, both of Hitachi; Masahito Ikeda, Ibaraki, all of Japan

[73] Assignee: Hitachi, Ltd., Tokyo, Japan

[21] Appl. No.: 913,361

[22] Filed: Jul. 15, 1992

[30] Foreign Application Priority Data

Jul. 19, 1991 [JP] Japan ................. 3-179178

[51] Int. Cl.$^5$ ............. B61L 27/00; B60L 15/38
[52] U.S. Cl. ............. 246/5; 246/187 A; 104/301; 307/35
[58] Field of Search ........ 104/298, 300, 301; 307/29, 31, 35, 140, 141; 191/2; 246/3, 4, 5, 187 R, 187 A, 187 B, 182 R

[56] References Cited

U.S. PATENT DOCUMENTS

| | | | |
|---|---|---|---|
| 1,237,953 | 8/1917 | Place et al. | 191/2 |
| 1,535,623 | 4/1925 | Moss et al. | 191/2 |
| 1,777,952 | 10/1930 | Adsit et al. | 191/2 |
| 3,506,823 | 4/1970 | Failor | 246/187 R X |
| 3,794,977 | 2/1974 | Thorne-Booth et al. | 246/5 X |
| 4,217,643 | 8/1980 | Anderson et al. | 246/187 R X |
| 4,659,943 | 4/1987 | Virant | 307/35 X |
| 4,680,663 | 7/1987 | Nogi et al. | 307/29 X |
| 4,694,192 | 9/1987 | Payne et al. | 307/35 X |
| 4,695,738 | 9/1987 | Wilmot | 307/31 |

FOREIGN PATENT DOCUMENTS

| | | | |
|---|---|---|---|
| 1465076 | 1/1969 | Fed. Rep. of Germany | 191/2 |
| 2423590 | 11/1975 | Fed. Rep. of Germany | 246/5 |
| 0124538 | 7/1985 | Japan | 191/2 |
| 0128804 | 7/1985 | Japan | 191/2 |
| 0206738 | 10/1985 | Japan | 191/2 |
| 0155149 | 7/1987 | Japan | 191/2 |
| 8801952 | 3/1988 | World Int. Prop. O. | 191/2 |

OTHER PUBLICATIONS

Mitsubishi Electric Technical Bulletin, vol. 164, No. 2, 1990 pp. 11(119)–17(125).

Primary Examiner—David A. Bucci
Assistant Examiner—Scott L. Lowe
Attorney, Agent, or Firm—Antonelli, Terry, Stout & Kraus

[57] ABSTRACT

A railway control system for controllably suppressing the maximum output of a railway substation for energy saving in a densified operation territory and, in which a predetermined upper limit value is established in the output of a substation. The output of the substation is always monitored by output monitoring apparatus, and, when the substation output exceeds an upper limit value, control command apparatus transmits a control command signal to any or several of output control apparatus, a train group and an operation administration system. The output control apparatus, train group or operation administration system which receives this signal performs output control or drive force control or both of them, thereby to limit the output of the substation at or below a predetermined value. It thus becomes possible to restrain a temporary output peak of a railway substation and to reduce the installed capacity. Further, with drive force regulation among a train group, an operation method having little overcapacity by gradual acceleration and deceleration is applied to each train, thus realizing energy saving along the entire route.

2 Claims, 17 Drawing Sheets

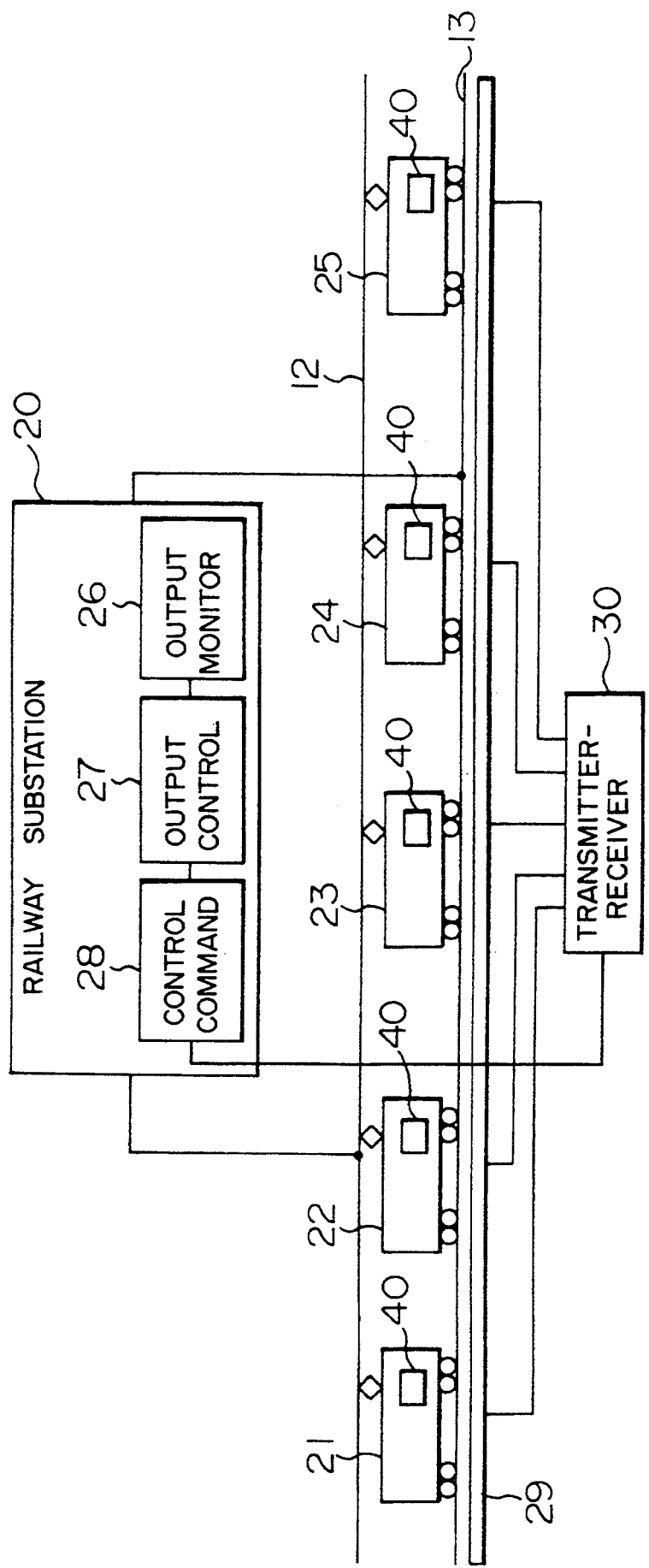

POWER SUPPLY REGULATION SYSTEM FOR A RAILWAY

BACKGROUND OF THE INVENTION

The present invention relates to a railway system and more particularly to a method for saving energy by controlling power output by railway substations and controlling drive force of groups of trains.

Recently there has been an increase in the number of passengers using train lines in commutable areas of large cities and in principal trunk lines connecting such cities. In the Yamanote of Japan for instance, a super-overcrowded train exceeding traffic congestion rate of 150% has become common during the rush hours in the morning. Under these circumstances, respective railway companies are planning to relieve traffic congestion by operating of extra trains, making up of longer-coach (carriage) trains, introduction of no-seat trains and so forth. However, it has already become impossible to operate extra trains during the morning and evening rush hours.

The limits of the capacity of railway substations may be mentioned as one of the reasons for the above. An example of a feeding method by railway substations will be described with reference to FIG. 1. Reference numerals 1 to 11 in FIG. 1 represent trains, 12 represents a trolley cable or pantograph feed cable, 13 represents a track rail, 101, 102 and 103 represent railway substations, and 104, 105 and 106 represent electric power supply territories of the railway substations 101, 102 and 103, respectively. Besides, the electric power supply territories 104 to 106 vary to some extent depending on difference of voltage between a railway substation and an adjacent railway substation, and do not correspond to ordinary territories among stations.

In an electric railway (hereinafter referred to as a railway), trains are operated by such a method that railway substations (hereinafter referred to as substations) 101, 102 and 103 convert electric power supplied by a power plant to predetermined specification. The electric power is supplied to trains 1 to 3, 4 to 8 and 9 to 11 located in electric power supply territories 104, 105 and 106, respectively, through the trolley cable 12. One substation usually supplies electric power to four to five trains which may be present on the railroad lines in the suburbs of big cities. A train consumes electric power at a time of accelerating control. A train is frequently required to perform acceleration and deceleration control in departing from a and entering station since the distance between adjacent stations is generally short for commuter trains in urban districts of large cities. Even if a departure timing between trains has been adjusted in a railway schedule, variations of these departure times practically for every train due to delays resulting from various primary factors. Thus, it is difficult to stagger the departure timing perfectly. When an operation interval is shortened hereafter so as to increase the frequency of trains source under the above circumstances, power consumption is increased temporarily. Also a notable peak is generated in the substation output since the probability that a plurality of trains perform power running at the same time in the same electric power supply territory is increased. In the prior art, however, a substation does not provide control for restraining the output peak power. Further, timing of power running and a decision of notch steps in a train group are based on their reference rules determined only for each individual train. Further a power output state of a substation and states of other trains located in the same electric power supply territory are not taken into consideration.

According to the above-mentioned prior art, since a power consumption peak is increased, it becomes difficult to cope with such a state with the present substation capacity. Further, system designed with a capacity of at least the temporary peak of power consumption produces useless overcapacity of in the installations. Furthermore, since electric rates contracted by a substation are decided with constant consumption as a reference, expensive additional rates are charged for a temporary peak exceeding the extent of the contract, which causes increased transportation costs.

SUMMARY OF THE INVENTION

It is an object of the present invention to provide a railway system which is able to reduce the maximum electric power demand and the electric power supply by substations in a high density operation territory and also to achieve overall energy saving.

In order to achieve the above-described object, according to one aspect of the present invention, a railway system is constituted by substations each having output monitoring means for monitoring electric power output of the substation, control command means for controlling the power output by the substation by issuing an appropriate output command and output control means for controlling the power output of the substation based on the output command; and a plurality of trains each having location detecting means for detecting at least a location of the train in an electric power supply territory of the substation and drive force control means for controlling drive force of the train. When it is found by the monitoring means that the output of the substation has exceeded a predetermined value or it is forecast to exceed that value, the power output of the substation is controlled by the output control means. Each train has drive force regulation means which detects information of location and delay state from a given travel schedule of the respective train located in the electric power supply territory, communicates with other trains to transmit the detected information and determines a drive force control value on basis of the the transmitted information to thereby control the drive force of respective train by the drive force control means.

When the output of any substation is found to have exceeded or is forecast to exceed the predetermined value by the output monitoring means, the substation output is restrained within the predetermined value by the control command means. Furthermore, respective locations and delay situations of the trains are detected by mutual communication among the trains located in the electric power supply territory, and the drive force control means decides the drive force of the respective train based on the detected information. With this, it becomes possible to restrain a temporary peak of power consumption by the fact that the train group located in the electric power supply territory regulates their drive forces mutually. Further, energy saving becomes possible by a train operating method suppressing electric power supply capacity of the substation below a predetermined reference level. Thus, according to the railway system of the present invention, train operation with a peak of power consumption restrained becomes possible by means of output control of a substation along with mutual regulation of the drive forces among trains. Further, it is possible to aim at overall energy saving by a highly efficient operation method making the most of the operation margin of the railway schedule.

BRIEF DESCRIPTION OF THE DRAWINGS

FIG. 13 is a diagram showing a third embodiment of a railway system according to the present invention;

DESCRIPTION OF THE PREFERRED EMBODIMENTS

Figure 1:
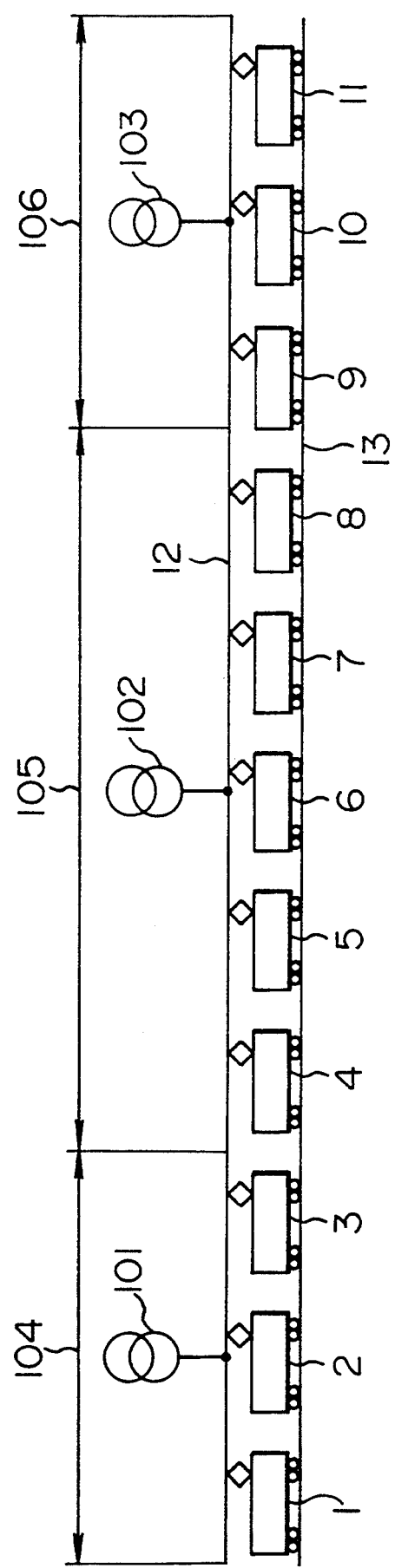
FIG. 1 is a diagram for explaining an electric power supply method in an electric railway system.
Figure 2:
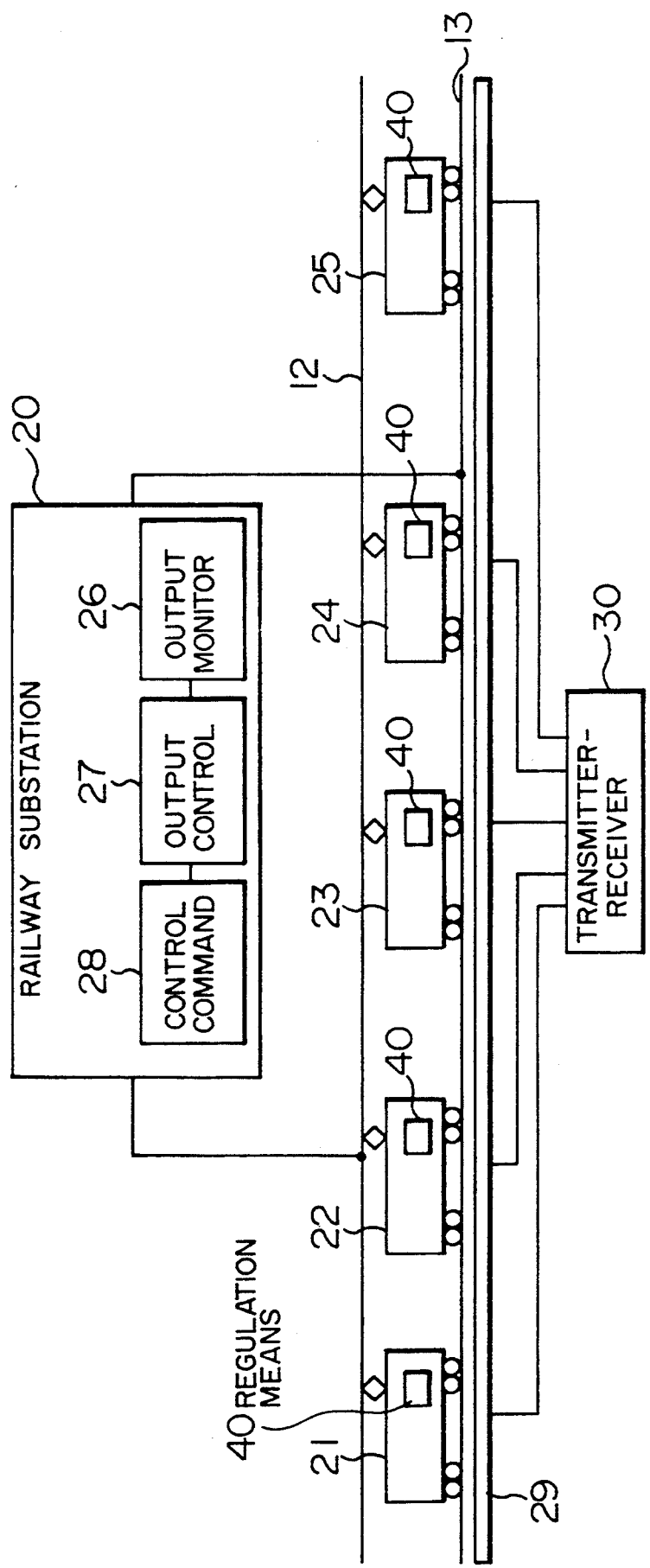
FIG. 2 is a diagram showing a first embodiment of a railway system according to the present invention.
Figure 3:
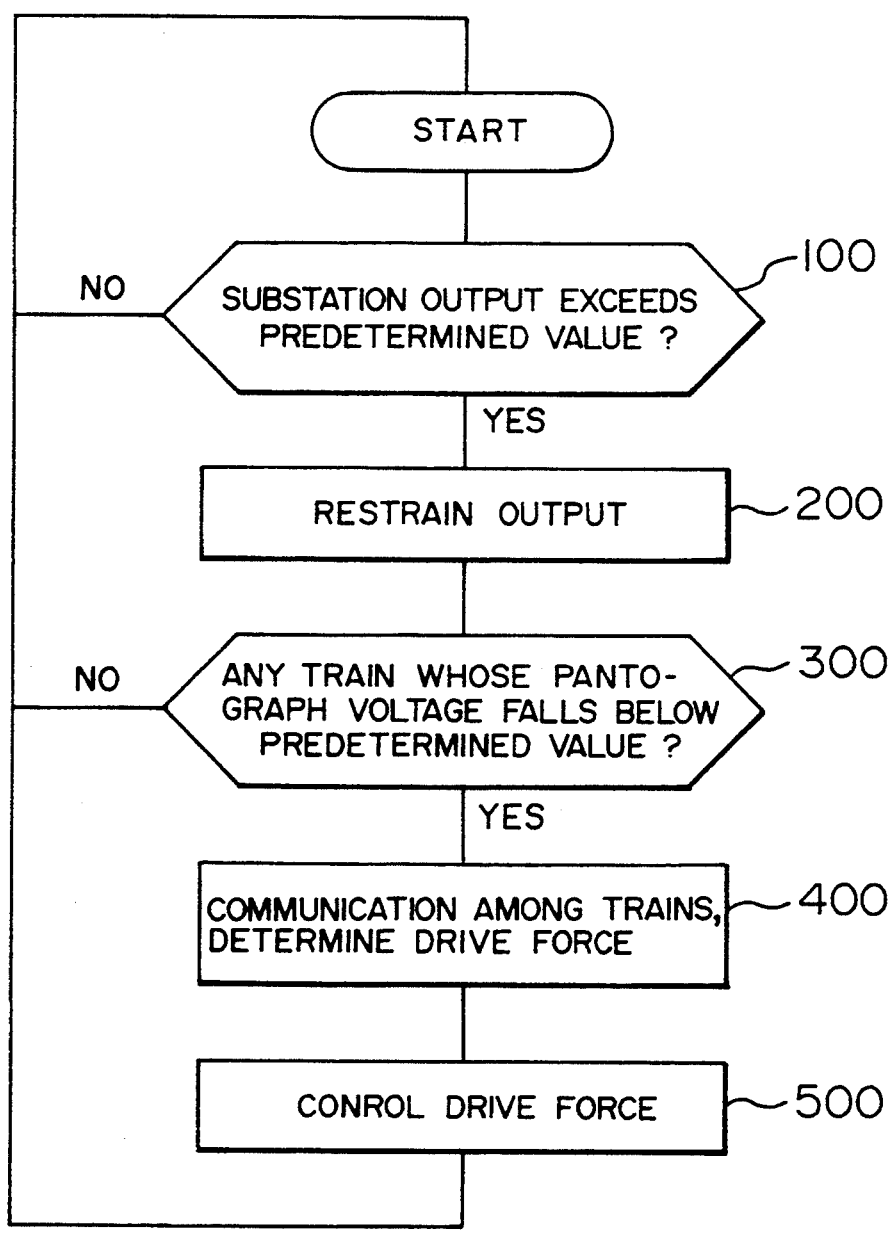
FIG. 3 is a flow chart for explaining the operation of the system in the first embodiment.

FIG. 2 is a general block diagram showing an embodiment of a railway system of the present invention. FIG. 3 is a flow chart for explaining the operation of the system shown in FIG. 2. In FIG. 2, a reference numeral 12 represents a trolley cable, 13 represents a track rail, 20 represents a railway substation, 21 to 25 represent trains located in an electric power supply territory of the railway substation 20, 26 represents output monitoring means of the railway substation 20, 27 represents output control means of the railway substation 20, 28 represents control command means, 29 represents a leakage coaxial cable (LCX), 30 represents a transmitter-receiver, and 40 represents regulating means installed in each train. The output of the substation 20 is always monitored by the output monitoring means 26. The monitoring operation of one cyclical period will be described with reference to FIG. 2 and FIG. 3. The monitoring means 26 monitors to detect whether the output of the substation 20 exceeds a predetermined value or not in a step 100 shown in FIG. 3. When the output is not over the predetermined value, the substation continues to supply electric power. However, when the predetermined value is exceeded or it is detected that the predetermined value will be exceeded, the control command means 28 transmits an output control command signal to the output control means 27, and the output control means 27 limits the output of the substation 20 in a next step 200. A voltage applied to pantographs (hereinafter referred to as a pantograph voltage) of the trains 21 to 25 falls by this output control, but the pantograph voltage has to be maintained at or above a predetermined value in order that electric equipments installed on respective trains operate normally. Usually, this value is to be 1,300 V in the feeding territory of d.c. 1,500 V. Therefore, when it is recognized by any of the regulating means 40 that the pantograph voltage of any one of the trains 21 to 25 located in the electric power supply territory of the substation 20 falls below the predetermined value, the trains 21 to 25 regulate mutually the respective drive forces for their running by using the regulating means 40 installed on each of them in a step 400. As discussed herein later, such regulation is performed by mutual communication of drive force control information among regulating means of the trains through the transmitter-receiver 30 and the LCX 29. The information dispatched from a train is transmitted once to the transmitter-receiver 30 through the LCX 29 and transmitted to another train from the transmitter-receiver 30 through the LCX 29 (refer, for example, to Mitsubishi Electric Technical Bulletin Vol. 164 No. 2, 1990, pp. 11(119)–17(125) for a signal communication method using an LCX). The mutual regulation of train drive forces among trains will be described in detail with reference to FIG. 4 and FIG. 5. When the control of the drive forces of respective trains is decided by the regulation among the trains, they control the respective drive forces in a step 500 in accordance with the result of the decision, thereby to maintain the pantograph voltages of the respective trains at a predetermined value. According to the present embodiment, it is possible to restrain an instant peak of the substation output by providing upper limits on the substation power outputs and automatically controlling them to be below the limits. Thus, with such a peak cut, it becomes possible to make the installed instrument capacity of the substation smaller, thus, making it further possible by introducing the present control system into existing railway train operating instruments and facilities to increase a total number of operating trains along a route where densification or increase of the number of trains has been difficult so far due to the limit of the substation capacity.

Figure 4:
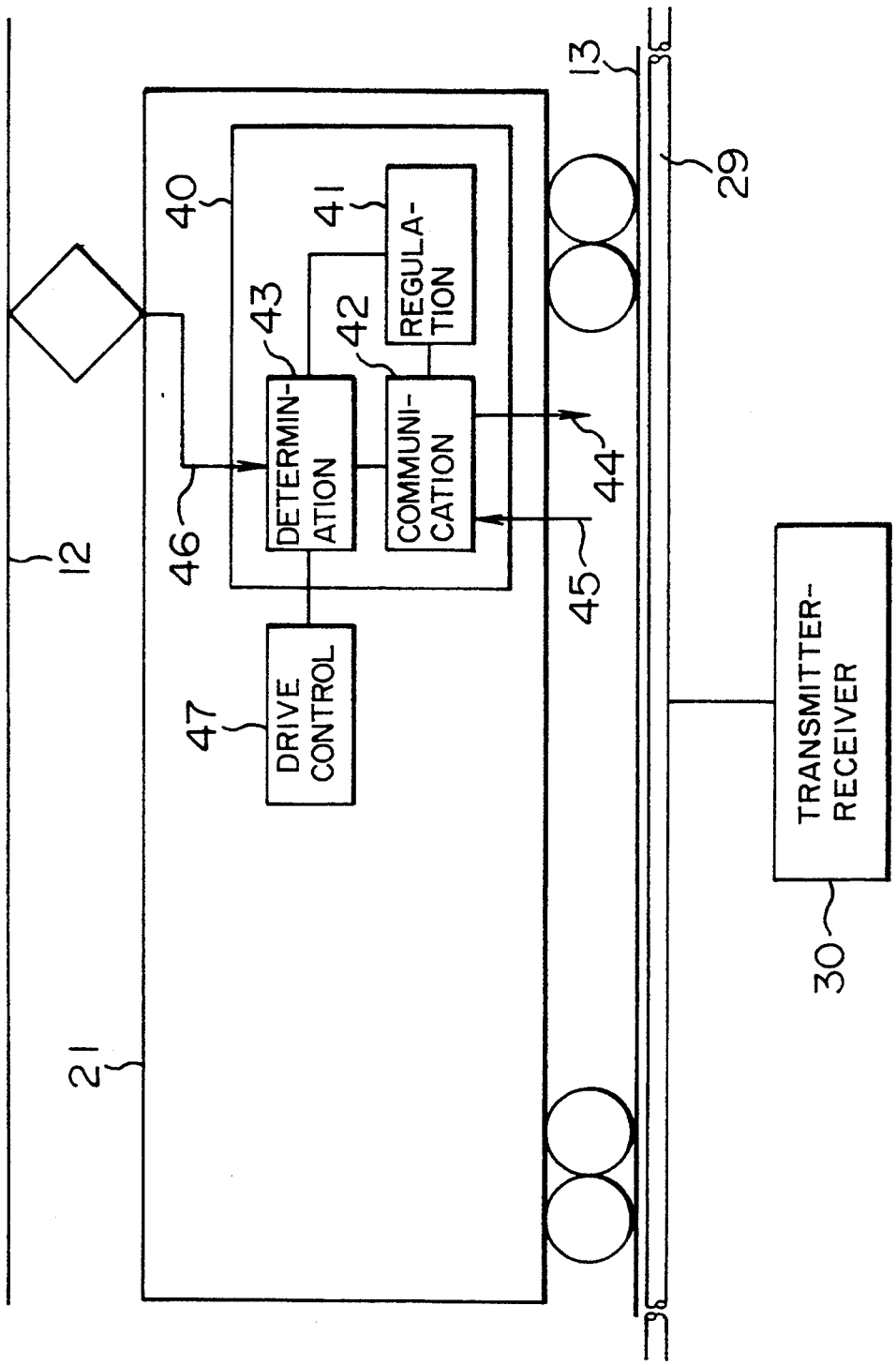
FIG. 4 is a diagram for explaining regulation means provided in each train for regulating its drive force in association with those of other trains.
Figure 5:
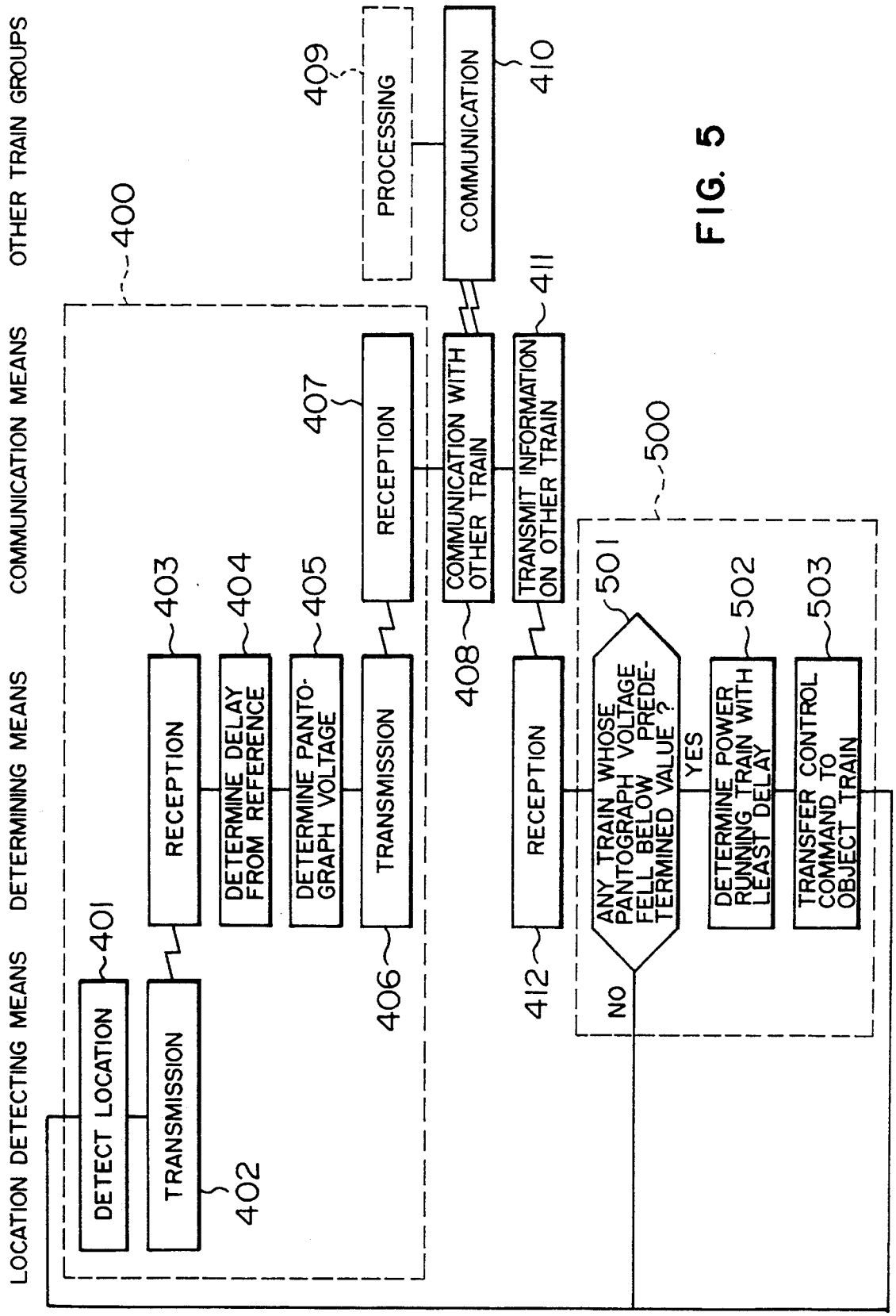
FIG. 5 is a diagram for explaining the control flow of respective elements of the regulating means for the regulation of train drive forces among trains according to the present invention.

Next, the regulation of the drive forces among trains will be explained with reference to FIG. 4 and FIG. 5 taking a train 21 as an example. FIG. 4 is a diagram showing the structure of regulating means 40, in which 21 represents a train, 41 represents location detecting means, 42 represents communication means, and 43 represents determining means. Further, 44 represents information transmitted to another train, 45 represents information received from another train, and 46 represents information of a pantograph voltage of the train 21. 47 represents a drive system control section of the train 21. Further, FIG. 5 is a flow chart showing the operation of respective components shown in FIG. 4. In the regulating means 40, the location detecting means 41 detects the location on the line of the train 21 itself in every constant period in a step 401, and transmits this information to the determining means 43.

A method using a tachometer generator is used for the location detecting means of a train to detect its own location. According to the method, the generator for generating a pulse having a frequency corresponding to a rotational speed of a wheel axle is mounted on the train, so that the generated pulse is counted to integrate value of distance that the object train has travelled thereby to detect the location on the line. However, an error may be caused in the counted distance because of slip of the axle, reduction of the circumference due to grinding of the axle at time of maintenance and repair of train carriages and so on by this method only. Therefore, a transponder ground unit for generating a distance signal is installed at every appropriate location so as to enable a train location detecting means to correct the detected location. When passing that location. In the determining means 43, a possible delay from a standard travelling pattern of the object train 21 is computed by collating the detected information on the location with that of a predetermined railway schedule in a step 404. Next, in a step 405, information 46 of the pantograph voltage is received by the determining means 43, which determines whether the pantograph voltage is maintained within a predetermined range or not. In a next step 406, the information of the train identification number and the delay from the schedule standard is transmitted to the communication means 42 when the pantograph voltage is maintained within a predetermined range. Alternatively, when the pantograph voltage is not maintained within the predetermined range, additional information of the pantograph voltage is added to the information of the identification number and such information is the delay and transmitted to the communication means 42. The communication means 42 uses this information as the information 44 to be transmitted to the other trains in the step 406. The information 44 is transmitted to other trains located in the same feeding (power supply) territory as the train 21. The train 21 also receives the information 45 from other train, thus performing the mutual communication among the trains. At this time, it is assumed that a process indicated by a broken line 409 in FIG. 5 have been also performed in other trains similarly to the train 21. Process 409 includes operations corresponding to steps 401 to 407. The necessary communications are performed through the transmitter-receiver 30 and the LCX 29 as explained with reference to FIG. 2. When such information on all the trains located in the same feeding territory are completely collected in step 408, the communication means 42 transmits these information to the determining means 43 in step 411. The determining means 43 which has received these information in step 412 determines drive force controlling methods for respective trains located in the same feeding territory in accordance with a rule surrounded by a broken line 500. First, in step 501, the determining means checks to detect existence of a train in which the pantograph voltage is not maintained within the predetermined range. In case there is detected no such a train, the processing is returned to the step 401 and waits for a next sampling period. In case there is detected such a train, even if one, however, it determines the respective drive force control methods for trains located in the same territory in step 502. A determining rule for the drive force control includes that of reducing the drive force of one train having the least delay, that of computing degrees of respective controlled reduction of drive forces of trains whose pantograph voltages are low and need to be controlled, the computation being made based on the voltage, the location, the distance from the substation and the like, and so on. At this time, all of the rules of the determining means. 43 installed in all the trains are the same with one another so that variations are not caused in their determination depending on each train. Further, there are methods of speed control and torque control for the drive force control. Each train aims at recovery of the above-mentioned pantograph voltage by transmitting a command of drive force control method applicable to the train to the drive system control section 47 in a step 503 and suppressing its drive force. Besides, for the communication among trains, there are those methods using a telephone line for public mobile communication, an artificial satellite, a radio communication circuit permitted to railway traders, inductive radio and the like other than the above-mentioned system using the LCX.

Figure 6:
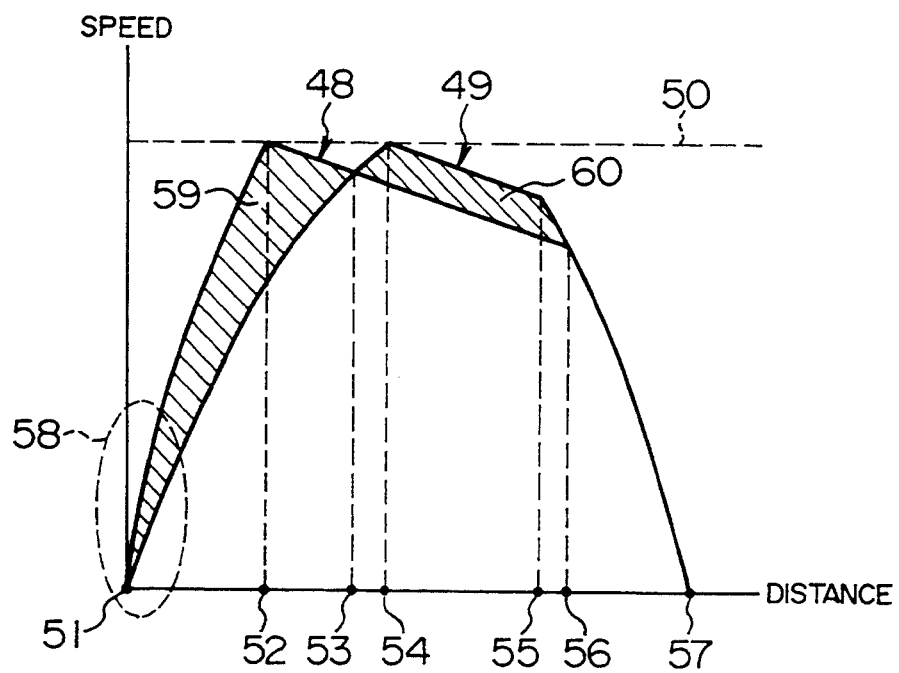
FIG. 6 is a diagram for comparing relations of train running speeds and distances which trains between an energy saving system and required passed respectively of a conventional system and of an energy saving system of the present invention.

Next, a relation among the drive force control, suppression of energy consumption and pantograph voltage security of a train according to the present invention will be described as compared with that of a conventional system with reference to FIG. 6. FIG. 6 is a graph typically showing an example of a travelling pattern of a suburban type train covering a short distance between adjacent stations, in which the axis of abscissas shows a distance and the axis of ordinate shows train speed. An example in which the drive force of a train is restrained according to the present invention is compared with an example of a conventional train travelling under such condition that the maximum output of the substation is set leaving a margin against possible power consumption of the train. In the conventional train travelling pattern expressed with a solid line 48 in the figure, the train is accelerated in travelling for a while after departing from a station 51, and is stopped from accelerating when a territorial limit speed 50 is reached at a point 52 and coasts thereafter. As a result, the speed is reduced gradually. When the train reaches to a deceleration starting point 56, it starts deceleration by means of a brake and stops at a station 57. In the conventional travelling pattern, it is only in a territory section from the station 51 to the point 52 where the train is accelerated in travelling that the train consumes electric power. As acceleration gets higher, i.e., as the gradient of the graph 48 gets steeper in the territory section from the station 51 to the point 52, the power consumption becomes larger, and the pantograph voltage of the train is lowered. On the other hand, the train travelling pattern of the present embodiment is shown with a solid line 49. In the present embodiment, when the pantograph voltage of the train in the same electric power supply territory falls below a predetermined value, it is aim of the present embodiment to recover the pantograph voltage by restraining the drive force of the train. Hence the acceleration at time of power running is reduced. Accordingly, the time and the travel distance until the territorial limit speed is reached gets longer because the acceleration of the train is small after the train departs from the station 51, and it is accelerated in travelling up to a point 54. The train coasts thereafter up to the point 55 crossing with the station stop travel pattern, and starts deceleration from the point 55 and stops at the station 57. In the travel pattern such as shown with the solid line 49, the peak of power consumption is restrained by making the speed gradient in the acceleration territory smaller. Further, it is possible to expect the effect of energy saving by decreasing the acceleration in a neighboring territory of the acceleration start point where power consumption is large in particular. Furthermore, when a train appears whose pantograph voltage falls below the predetermined voltage, the drive force restraining control is performed among trains in cooperation with one another, thus reducing power consumption in the electric power supply territory on the whole and recovering the pantograph voltage of such a train. Besides, such recovery effect is conspicuous in a train in which drive force restraining control is performed so as to relieve the acceleration gradient in the travel pattern. It is forecast that the travel hours between adjacent stations are increased and trains are delayed by the restraining control, but no hindrance is generated practically in the travel hours between adjacent stations in the present embodiment because of reasons as follows. Since the drive force is not controlled in a travel pattern in a conventional railway system shown at 48, the speed from the starting station 51 to the point 53 becomes higher than that in the travel pattern 49 of the railway system in the present embodiment. Since the rise of acceleration in the conventional travel pattern 48 is steep, however, the train reaches the territorial limit speed at a location near to the starting station as compared with the travel pattern 49 in the present embodiment, and starts coasting. On the other hand, acceleration is slower by drive force restraining control in the travel pattern 49 in the present embodiment, and the train is accelerated in travelling up to the point 54 behind the case of the conventional travel pattern 48. As a result, the pattern 49 of the present embodiment shows travel at a higher speed than the conventional pattern 48 in the territory from the point 53 where the conventional pattern 48 and pattern 49 of the present invention cross each other to the point 56 where the decelerating patterns are in accord with each other. Although the difference between hours required between adjacent stations by both travel patterns can not be read exactly from FIG. 6 since no time base is shown in FIG. 6, the difference can be roughly regarded as the difference between areas of hatched portions 59 and 60. Therefore, when the area of the portion 59 becomes remarkably smaller than that of the portion 60, the drive force control according to the present embodiment may constitute a hindrance to train travel operation. On the contrary, however, the travel hours taken in the pattern 49 of the present embodiment may become shorter than the travel hours taken in the conventional pattern 48.

Next, the result of simulation of the present embodiment will be described with reference to FIG. 7 to FIG. 10 in which it is compared with the result of simulation by a conventional control system.

Figure 7:
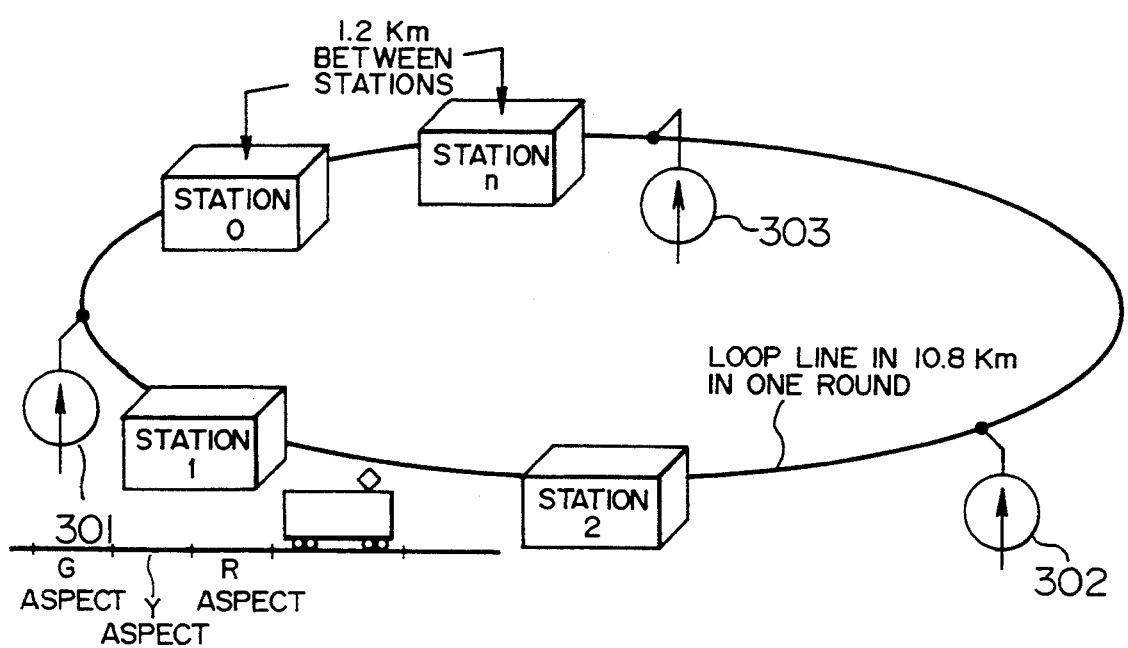
FIG. 7 is a diagram expressing an image of a model used in simulation for verifying advantageous effects of the present invention.

FIG. 7 is a diagram for explaining a model used for the simulation, in which 301 to 303 represent substations. In the present simulation, similar or equal patterns of block assignment, distance between adjacent stations and railway schedule have been used in order to make it easy to grasp the effect of energy saving by the present invention.

301 to 303 represent railway substations, which are located at intervals of 3.6 Km and fed at d.c. 1,500 V. Further, the stations are arranged at equal intervals of 1.2 Km, and nine stations are installed along a route 10.8 Km long in one round. All the stations are sectioned by blocks at equal intervals, and an aspect R indication for a block following the block where the farthest rear of a train is located, an aspect Y indication for the block following to the block where the aspect R is indicated, and an aspect G indication for the blocks thereafter are made. A train model in which dynamic characteristics of a type presently used for electric commutator trains in urban districts are modelled with numerical expression is used, and the train length of each train is set at 200 m. Further, all the trains stop at every station, and the time required for travelling between adjacent stations is 85 seconds, and the train stops at every station for 30 seconds.

In the present simulation, several cases have been experimented by changing the number of trains and operation interval which are parameters for deciding transport capacity, and by changing the control system and the upper limit of the output power of the substation on the power supply side, in order to evaluate the power saving control system when densified transportation is realized. Densification of the train in this case was simulated by changing the number of trains in the route between six trains and eight trains and shortening the operation interval according to such change. Two types of systems according to a conventional type and the present invention have been used for the control system of the substation so as to examine the effects of energy saving depending on the difference between the control systems. Incidentally, the conventional type means a system for supplying electric power as much as required by the train group without suppressing the substation output, and the system according to the present invention means a system for controlling the output so that the output electric power from the substation does not exceed a predetermined value at any time. In the latter, the train drive force control is-performed so that train running acceleration is stopped from a powered running train having the smallest delay from the standard railway schedule in a consecutive order of stopping less-delayed trains so as to prevent lowering of their pantograph voltage.

Figure 8:
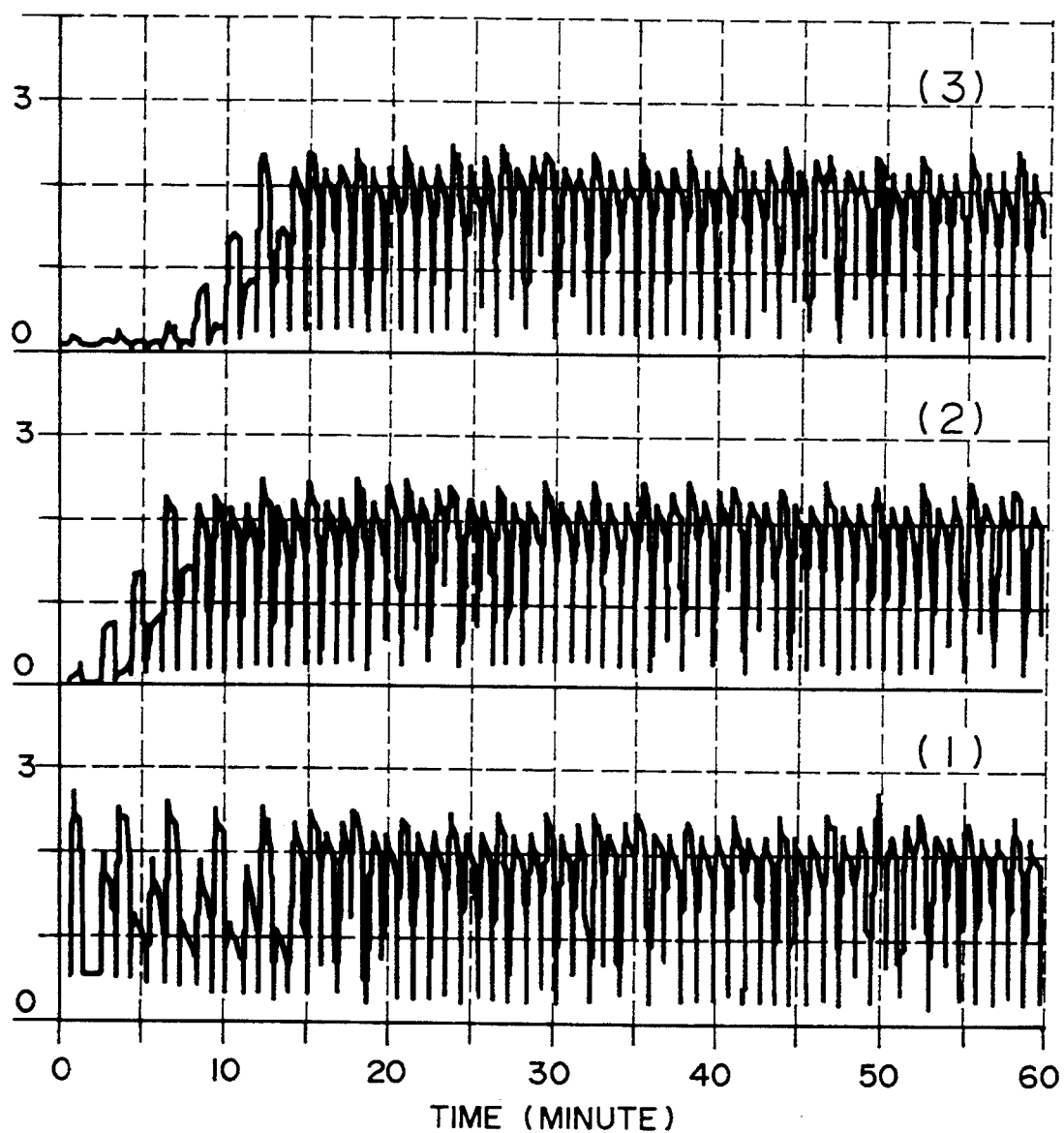
FIG. 8 is a graph showing instant output change of a substation in a conventional feeding system obtained as a result of the simulation.
Figure 9:
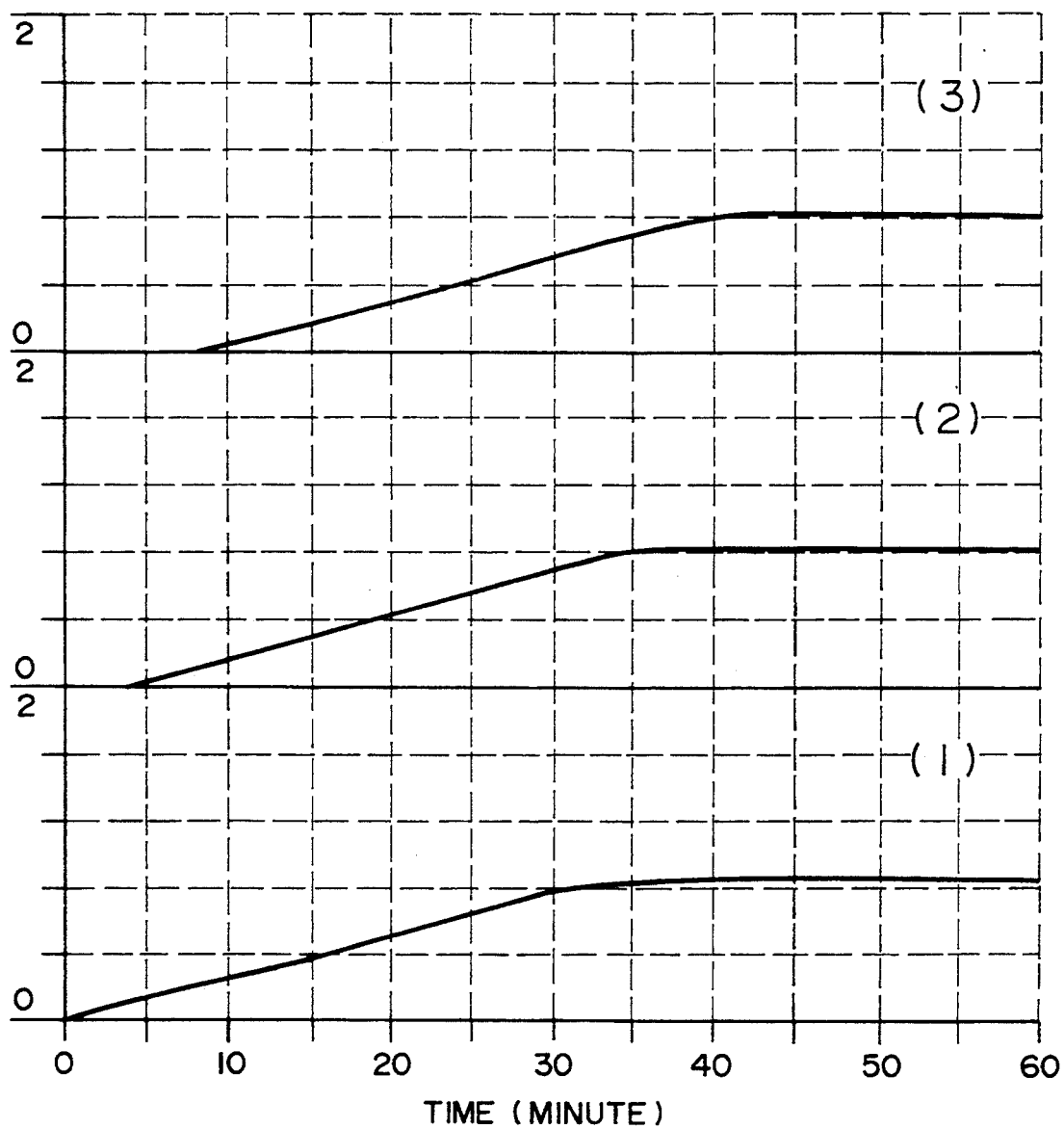
FIG. 9 is a graph showing a change of 30-minute integrated output electric energy of a substation in a conventional feeding system obtained as a result of the simulation.

Next, the result of simulation of a conventional feeding system will be described hereinafter with reference to FIG. 8 and FIG. 9. FIG. 8 is a graph showing a change of output electric power of respective substations according to the conventional feeding system, in which the axis of ordinate expresses output electric power and the axis of abscissa represents time. In these FIGS. (1), (2) and (3) show output change of respective substations 301, 302 and 303. In the present case, the maximum instant output electric power among three substations showed 2.6 MW. Further, frequent ripple in the instant output electric power is caused by the influence of power running/power running off of the train group. Besides, the instant maximum electric power governs the installed capacity of the power station, thus exerting a big influence. Further, FIG. 9 shows a value obtained by integrating output electric power for 30 minutes in the above-mentioned case, i.e., a change with the passage of time of integrated electric energy for 30 minutes. The integrated electric energy for 30 minutes has a value having a big influence upon the contract demand rate. The axis of ordinate of the graph shows integrated electric energy for 30 minutes, and the axis of abscissa thereof shows time. (1), (2) and (3) in FIG. 9 show data of the substations 301, 302 and 303, respectively similarly to FIG. 8. The reason why about half of the left parts of respective graphs have a rightward rising gradient is that the time which becomes an object of integration increases until 30 minutes elapse because the value along the axis of ordinate at respective times in the present graph shows a value obtained by integrating output electric power for 30 minutes until reaching to the time. In the experiment of the present case, as it is understood from the right half of the graph, where it is stabilized with variation of 0.8 MWh plus some quantity, the maximum value of the integrated electric power for 30 minutes obtained by adding up the electric energy from three substations was 2.6 MWh. Further, average time required for a train to travel between adjacent stations was 82.7 seconds.

Figure 10:
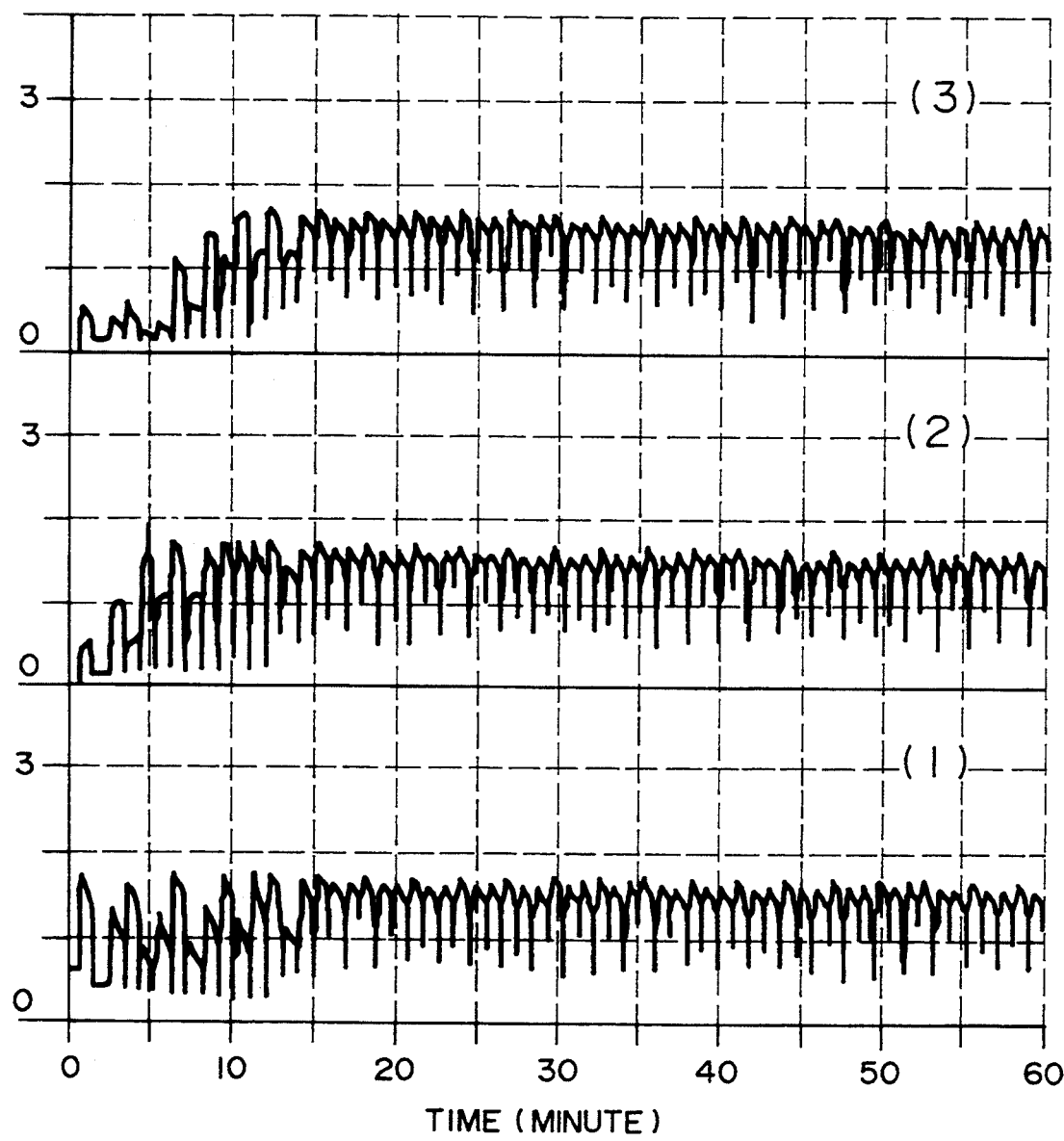
FIG. 10 is a graph showing instant output change of a substation in a feeding system according to the present invention obtained as a result of the simulation.
Figure 11:
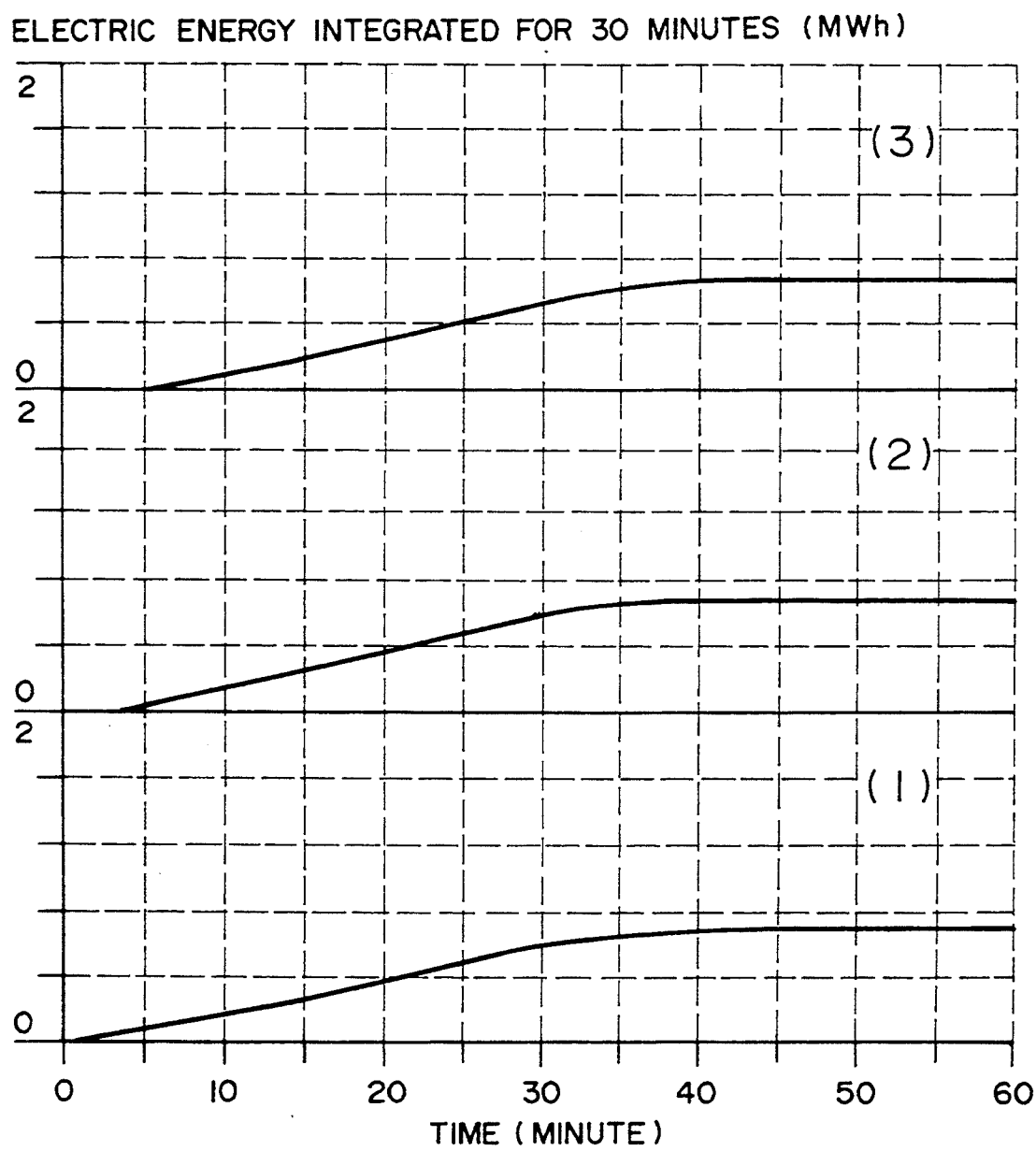
FIG. 11 is a graph showing a change of 30-minute integrated output electric energy of a substation in a feeding system according to the present invention obtained as a result of the simulation.

On the other hand, FIG. 10 shows changes with the passage of time of output electric power of respective power stations in the case of energy saving according to the present invention, in which the axis of ordinate shows output electric power and the axis of abscissa shows time. (1), (2) and (3) shown in FIG. 10 correspond to the outputs of the substations 301 to 303, respectively, similarly to FIG. 8. Since the upper value of the output electric power of respective substations has been set to 1.7 MW in the present case, the instant maximum output electric power showed 1.7 MW. This fact shows that the upper limit is restrained by approximately 35% as compared with the conventional feeding system shown in FIG. 8. Further, FIG. 11 shows the change of the electric energy integrated for 30 minutes. Items of the graph are similar to those shown in FIG. 9. The maximum value of the electric energy integrated for 30 minutes obtained by adding up three substations together is 2.1MWh, which shows reduction by approximately 19.2% as compared with a conventional case. On the other hand, the average time required to travel between adjacent stations in the present case is 84.5 seconds, which is longer by 1.8 seconds as compared with a conventional case. However, this value is sufficiently absorbable by the margin which is set in the railway schedule in advance and is only about 2% of the time required between adjacent stations according to a conventional system.

Furthermore, it becomes possible to increase the number of travelling trains without increasing conventional substation power supply capacity. For example, under the route conditions described in the present embodiment, the output electric power from one substation has recorded the instant maximum output at 2.6 MW when the output of the substation is not limited by the conventional system. On the other hand, when the control system according to the present embodiment is introduced, a train made up of at least eight carriages can travel if the substation includes facilities of instant maximum output electric power at 2.6 MW (a train is made up of 10 carriages and only a train made up of six carriages can travel by the conventional system under the same conditions). Namely, it should be noted that an incremental amount of traffic volume (transportability) caused along the entire route by the increase of the number of trains becomes much larger as compared with a decremental amount of traffic volume (transportability) caused with the increase of travelling time between adjacent stations. Further, the energy required for one train of a boarding rate at 100% to travel 1 Km is reduced down to approximately 78 KJ when a train made up of 8 carriages is made to travel after introducing the control system according to the present invention as against that the energy has been approximately 84 KJ by the conventional system, thus realizing a highly efficient transportation.

As described above, according to the present embodiment, not only the installed capacity of the substation can be reduced as compared with the past, but also substantial reduction of working energy becomes possible. Further, the influence exerted by the present control system upon the required hours between adjacent stations is very small, and the traffic volume is little reduced.

Figure 12:
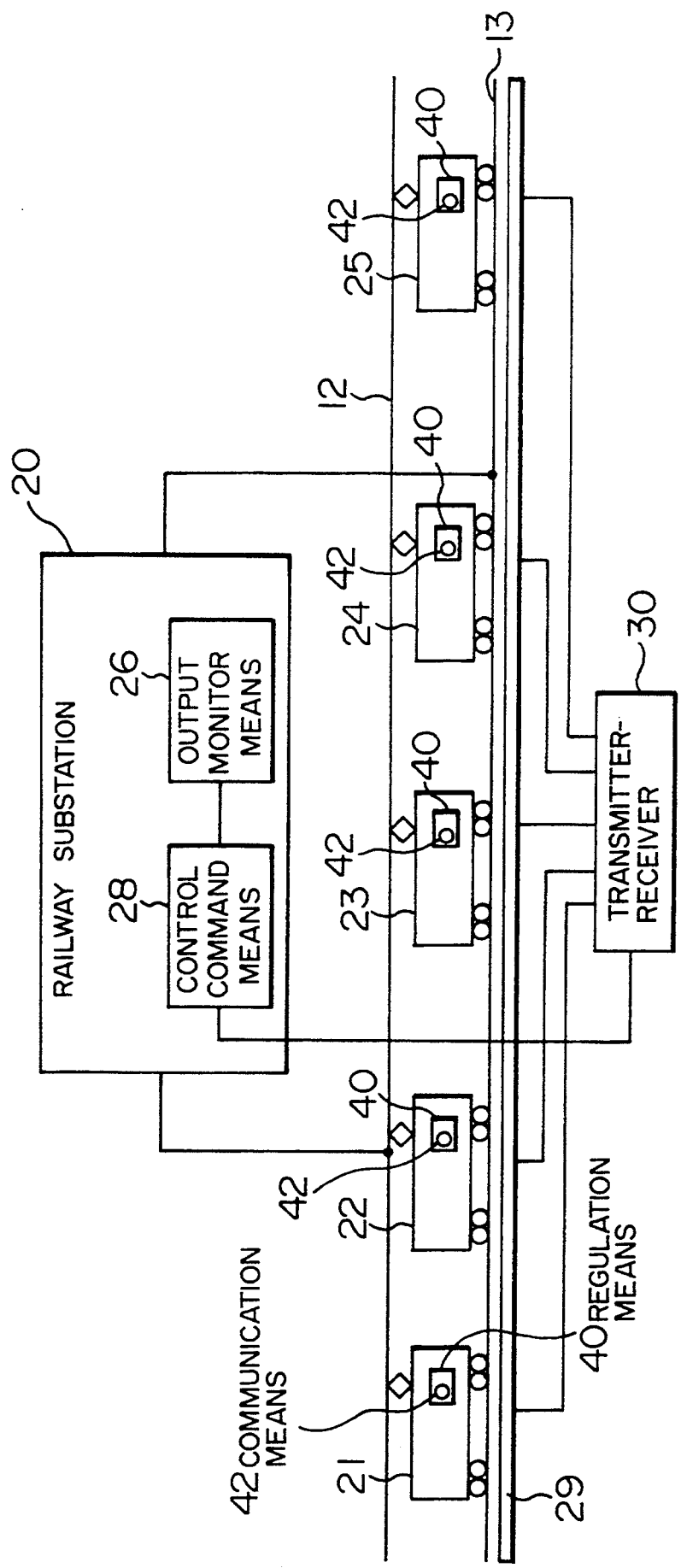
FIG. 12 is a diagram showing a second embodiment of a railway system according to the present invention.

Next, the second embodiment of the present invention will be described with reference to FIG. 12. It is a general block diagram showing a second embodiment of a railway system of the present invention. In the present embodiment, control command means 28 is connected to a transmitter-receiver 30. In a system of the present structure, the output of a substation 20 is always monitored by monitoring means 26, and the control command means 28 transmits a drive force control command, e.g., a signal for restraining drive force when a predetermined value is exceeded by the substation output. This signal is received by a receiver 30, transmitted again from the transmitter-receiver 30 to an LCX 29 installed in an electric power supply territory, and received by communication means 42 in each train. A train group which has received this drive force control signal regulates the drive force mutually by using regulating means 40 so as to control power consumption. The method for regulating the drive force in this embodiment is substantially the same as described with reference to FIG. 4 and FIG. 5. According to the present embodiment, the output control unit becomes no longer required in the substation, and it is also possible to avoid the risk that the pantograph voltage of trains located in an electric power supply territory drops to a predetermined value or below since energy saving control is performed only by drive force regulation of the train group.

Next, a third embodiment of the present invention will be described with reference to FIG. 13. FIG. 13 is a general block diagram showing a third embodiment of a railway system of the present invention. A railway substation 20 is provided with a monitoring unit 26, a controller 27 and a control command means 28, and the output electric power value is always monitored by the monitoring unit 26. When the output electric power value exceeds a predetermined value, the control command means 28 transmits a drive force control command to trains 21 to 25 through a transmitter-receiver 30 and an LCX 29, and also transmits an output control command signal to the output control means 27 at the same time. The group of trains 21 to 25 which have received the drive force control command signal control the respective drive force by the method described with respect to the second embodiment, and furthermore, the output controller 27 limits the output based on a predetermined reference value (e.g., setting of the output upper limit). For example, the limitation is such that the output need exceed a reference value even after the lapse of predetermined time. According to the present embodiment, it is possible to avoid extreme drops of the pantograph voltage by energy saving control by mutual regulation among trains within a certain range and to reduce the burden on mounted electric equipment, and it becomes also possible to prevent electric power peaks possibly caused when mutual regulation among trains is delayed from being generated by providing the output control function in the substation.

Figure 14A:
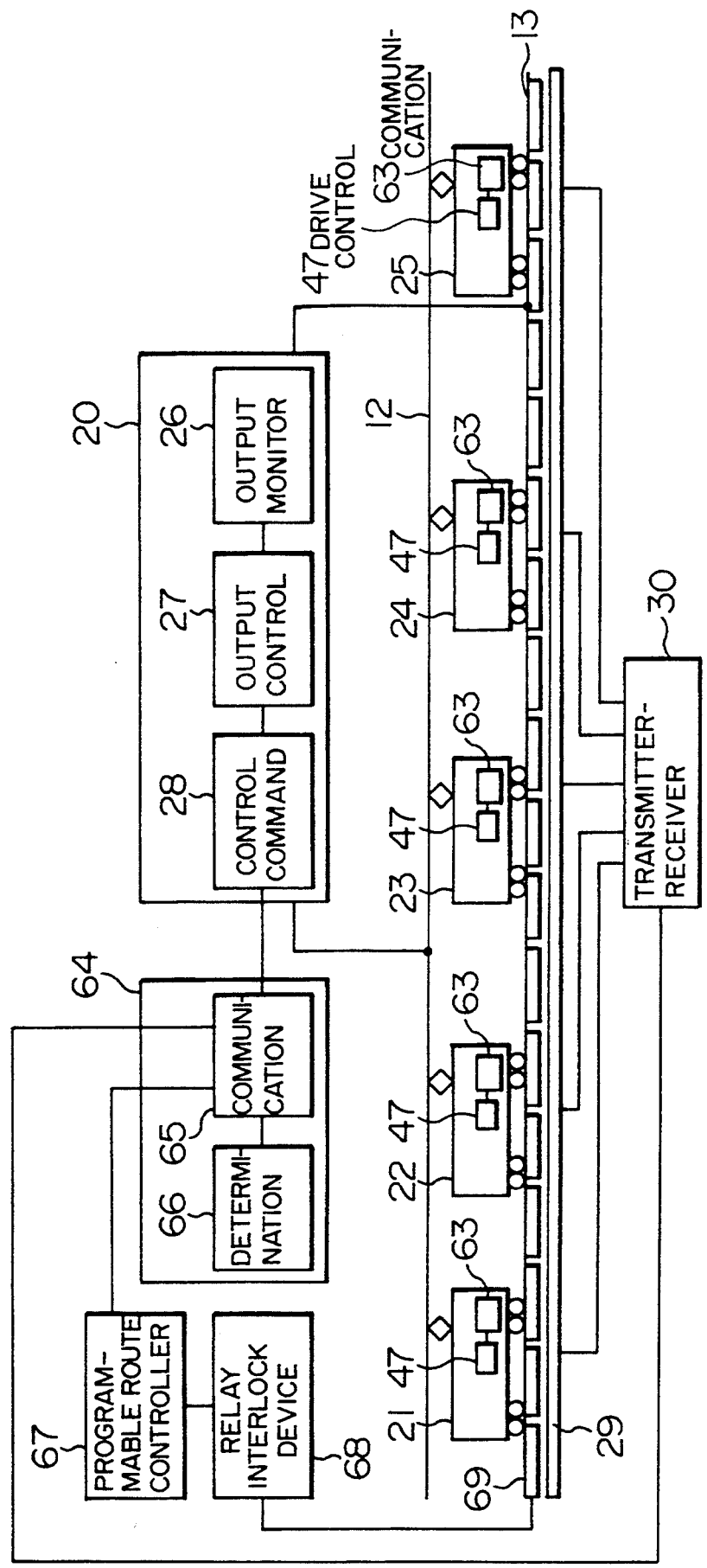
FIG. 14A is a diagram showing a fourth embodiment of a railway system according to the present invention.

Further, a fourth embodiment of the present invention will be described with reference to FIG. 14A. FIG. 14A is a general block diagram showing a fourth embodiment of a railway system of the present invention including an operation administration system. A reference numeral 64 in the figure represents an operation administration system composed of a large-sized computer or the like for instance, 65 represents communication means provided in the operation administration system 64, 66 represents determining means for computing delay hours of respective trains from locations of the trains located on an administration objective route and a predetermined railway schedule and regulating drive forces among trains, 67 represents a programmable route controller, 68 represents a relay interlocking device for switching signals and points, and 69 represents a track circuit for detecting the location of a train using a rail.

Here, the structure and the outline of functions of an operation administration system in the present embodiment will be described hereunder.

In the present railway system, the operation administration system is, usually, mainly composed of a large-sized computer and performs administration of a railway schedule. The administration of a railway schedule means an operation described as follows.

The operation administration system monitors travelling states of a train group by a method for tracking trains located on a control objective route by using control information, arrival and departure information at stations, train number detecting information and the like collected from the track circuit 69, the relay interlocking device 68 and the programmable route controller 67 so as to determine respective locations on a line, and compares a planned railway schedule of the train group held in the system with the information on the train group on a line obtained by the foregoing, thereby to grasp the delay status of respective trains.

Train operation adjustment is made when it is noticed as the result of the system operation that a train travelling delay has been generated in such an order that requires countermeasures on the train group. But it makes use of station commands and central commands in a majority of routes to perform train operation adjustment. Some routes, however, make use of train operational adjustment functions provided in an operation administration system and some make use of a computer for operational adjustment connected to an operation administration system, and the operational adjustment is the role of the operation administration system in such routes.

Further, such an operation administration system refers to a predetermined railway schedule on that day held in its own system and gives a departure command to a train stopping at that station, through respective stations sometimes, depending on the route. As to the departure command, a system using the sound of a buzzer, a bell or music has been adopted lately and a system of turning on a departure signal lamp are available. As an example of such an operation administration system including departure command functions, the municipal subway of Sapporo City Traffic Bureau may be mentioned.

Here, the fourth embodiment in which the abovementioned operation administration system is incorporated into the present invention will be described as follows.

The output of the substation 20 is always monitored by the monitoring means 26, and the control means 28 transmits a drive force control command to the communication means 65 of the operation administration system and transmits an output control command signal to the output control means 27 of the substation at the same time when the output exceeds a predetermined value. When the communication means 65 of the operation administration system receives the drive force control command signal, the determining means 66 determines the method for controlling the drive forces of the train group.

Here, an example of an algorithm for determining drive force control will be described hereunder with reference to FIG. 14B.

Figure 14B:
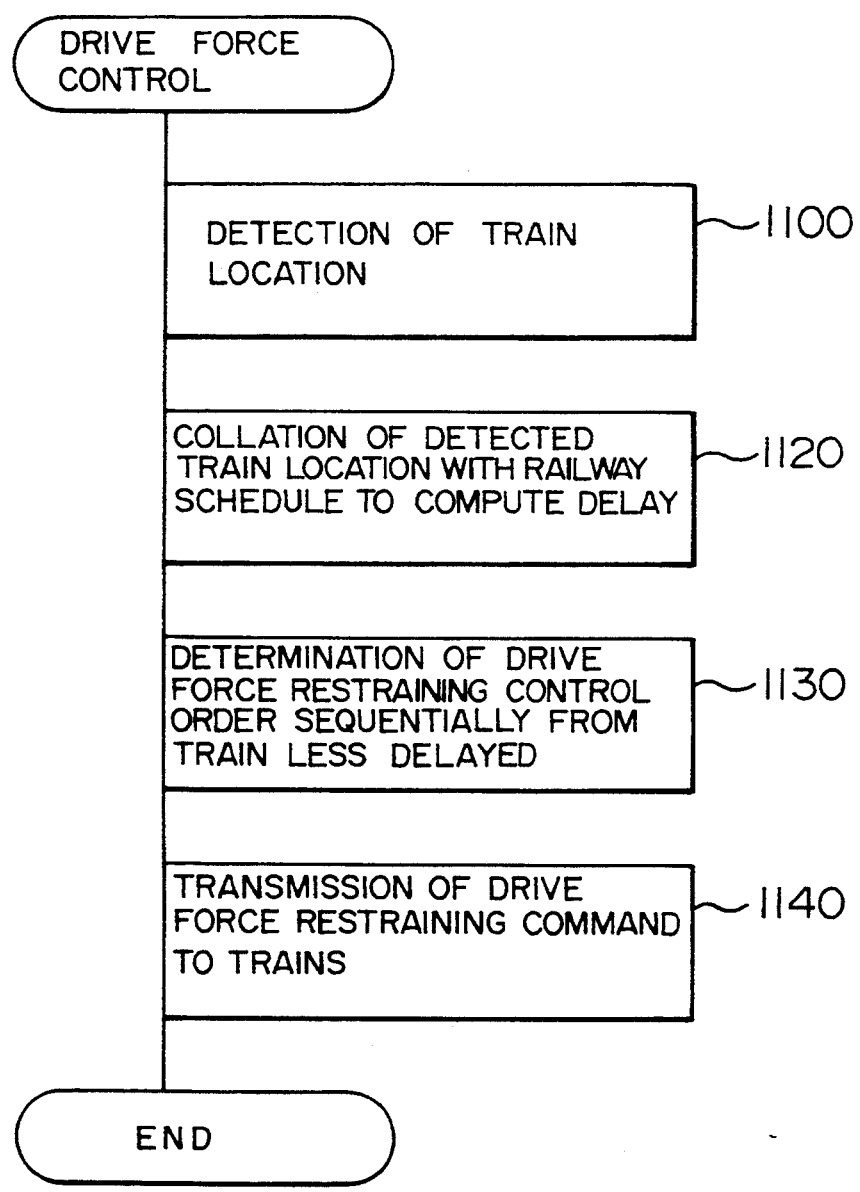
FIG. 14B shows an example of algorithm for determination of drive force.

Detection of the locations of the train group shown in a step 1100 in FIG. 14B is performed as the function of the conventional operation administration system as described previously, and it is assumed that this function is working in the present embodiment, too. Further, by collating the location of the train detected in a step 1120 with a predetermined railway schedule held in the operation administration system, delays from the railway schedule of all the trains located in the control objective territory of the operation administration system are computed. At this time, in case the delay hours from the railway schedule are distributed in a delay range within which they may occur usually, it is thinkable that the train group is in normal operation. Thus, a power running train, i.e., a train in an accelerated state, can be identified from its location on the line such as the neighborhood to and in the train departing direction from the station.

Next, in a step 1130, a drive force restraining order is decided in a consecutive order of from a power running train having the least delay to that having a less delay from the predetermined railway schedule among the power running trains located in the electric power supply territory of a power station which has currently issued the drive force control command, and commands for drive force restraint are transmitted for respective trains in a step 1140 in accordance with the foregoing. As to the drive force restraining demand, there are a method for commanding an acceleration stop simultaneously to several power running trains having small delays, a method for reducing acceleration degree stepwise for several trains sequentially from a power running train having a smaller delay, and so on. Furthermore, by taking into consideration of load status of the substations as a factor for the determination of the drive forces, it is also possible to make such a rule that the trains which are stopped from accelerating should be increased in number when peripheral substations including the substation currently concerned have big loads for instance.

Besides, it is decided not to take the train travelling status into consideration in effecting drive force regulation in case the power running train cannot be presumed from the location on a line due to large differences in the practical locations and practical running times of the running trains from those planned by the railway schedule. When a control method for trains in any electric power supply territory is decided, the communication means 65 transmits to the transmitter-receiver 30, a command signal for controlling a drive force of a respective train, which is decided as described above. The transmitter-receiver 30 transmits the command signal to the LCX 29 in respective block territories, and the communication means 63 of any train selects a control command signal corresponding to the train among the drive force control command signals received through the LCX 29 and transmits the selected command signal to a drive system control section 47. The drive system control section 47 which has received the control command controls the drive force of the train and aims at restraint of power consumption by controlling the driving system in accordance with the command.

Furthermore, the output controller 27 limits the output based on a predetermined reference output level. The pantograph voltage which has fallen below a predetermined value due to such a control is detected by a pantograph voltage detecting means on the train, the communication means 63 of the train transmits a pantograph voltage drop signal to the LCX 29. The transmitted signal is transferred to the determining means 66 of the operation administration system from the LCX through the transmitter-receiver 30. The determining means 66 identifies the number of trains whose detecting means have detected the pantograph voltage drop signal and respective location positions thereof, decides the methods (modes) for controlling the drive forces of respective trains again by using the above-mentioned method for deciding drive force control mode, transmits a drive force control command signal to the corresponding train using the transmitter-receiver 30 and the LCX 29 and additionally controls the drive force of the train. Since drive force regulation among trains by themselves is no longer required because the centralized control is performed for the regulation by using the operation administration system according to the present invention, it is no longer required for the location on a line of a train to always be determined, and communication among trains becomes unnecessary. Further, since information presently or already collected in the operation administration system is used for determining such drive force control, it is not required to provide new information collecting means in the operation administration system in order for introducing the present invention. Furthermore, it is possible to make surer the output peak cut of the substation by providing the output control means 27 in the substation 20 at this time.

Figure 15:
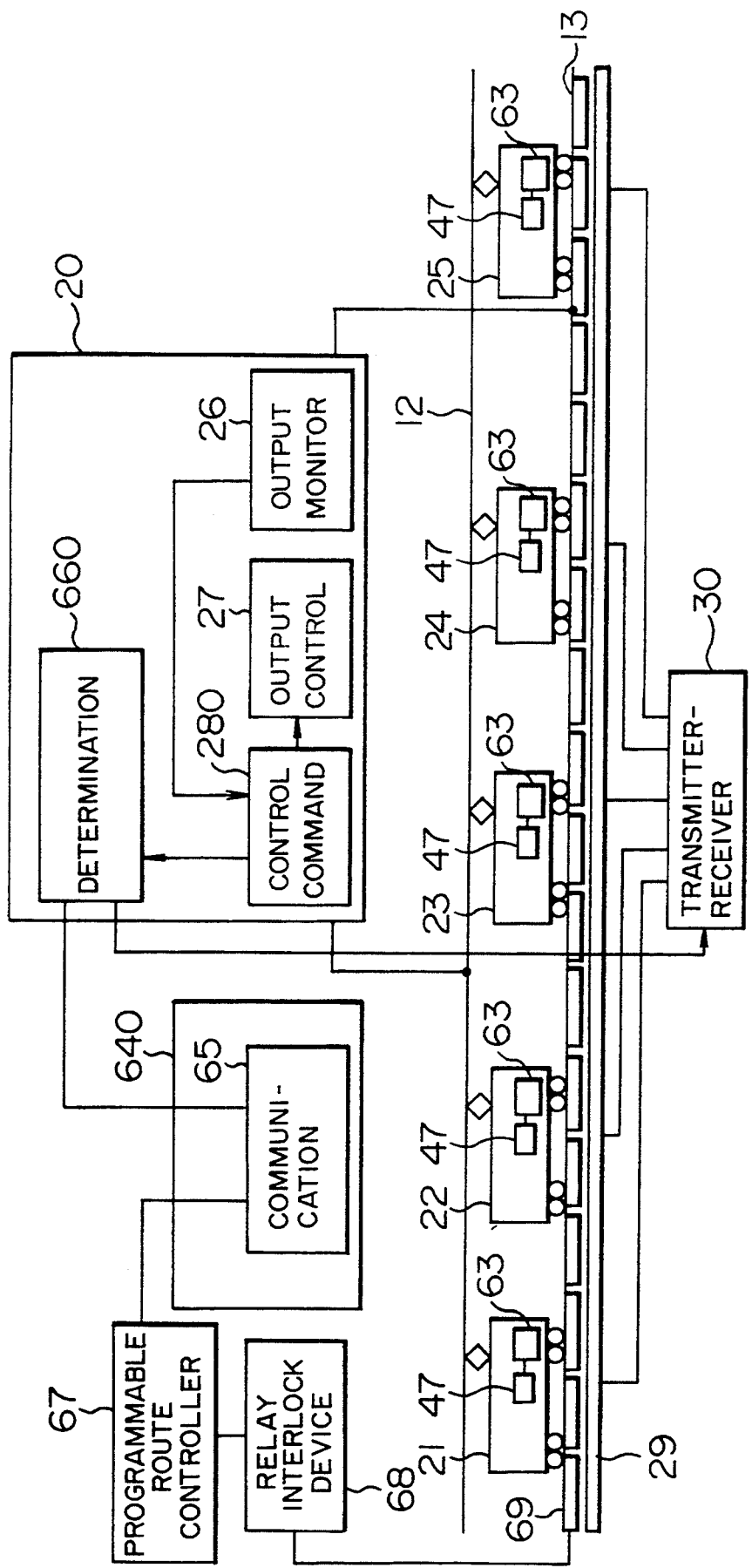
FIG. 15 is a diagram showing a fifth embodiment of a railway system according to the present invention.

A fifth embodiment of the present invention will be described with reference to FIG. 15 as an example that such determining means is provided in the substation. In the present embodiment, determining means 660 is provided in the substation 20, and a drive force control trigger signal is transmitted to the determining means 660 from control command means 280 in response to the output of the substation 20 exceeding a predetermined value or being presumed to exceed the same. The determining means 660 which has received this signal decides the drive forces of respective trains located in the electric power supply objective range. The information on the locations and the like of the trains used for the determination at this time is obtained from an operation administration system 640. The determining means 660 transmits a decided drive force to the transmitter-receiver 30 as a drive force control command signal in digital data form for instance. This signal is received by the communication means 63 of respective trains through the transmitter-receiver 30 and the LCX 29. Respective trains execute drive force control through the drive system control section 47 in accordance with the received drive force control command signal. The drive force control by the monitoring means 26, the output control means 27 and the determining means 660 can be performed in a similar manner to the fourth embodiment. According to the present embodiment, the drive forces of respective trains are decided at the substation, and the control signal communication becomes unnecessary among the trains, and it is also possible to simplify the train devices or mechanism for the drive force control since it is no longer required for the train to detect its location. Further, it is possible to decide a control state corresponding more closely to changes of the substation power output state by providing the determining means 660 in the substation.

Further, information related to the travelling state of the train group which is obtained from the operation administration system in the above-mentioned embodiments may be alternatively obtained directly from the transmitter-receiver by using means for detecting identification number of the trains, the respective communication means of the trains, and the LCX and the transmitter-receiver. According to this alternative, it is not only possible to simplify regulating means of respective trains similarly to the fourth and the fifth embodiments, but also to issue a drive force control command from the substation side without through the operation administration system.

Besides, mutual communication among trains, communication among substations and trains, and communication among trains, substations and the operation administration system used in the above-mentioned respective embodiments are performed as described hereunder.

Train to Train

A polling system from the transmitter-receiver is used for communication between the train and the transmitter-receiver.

Figure 16:
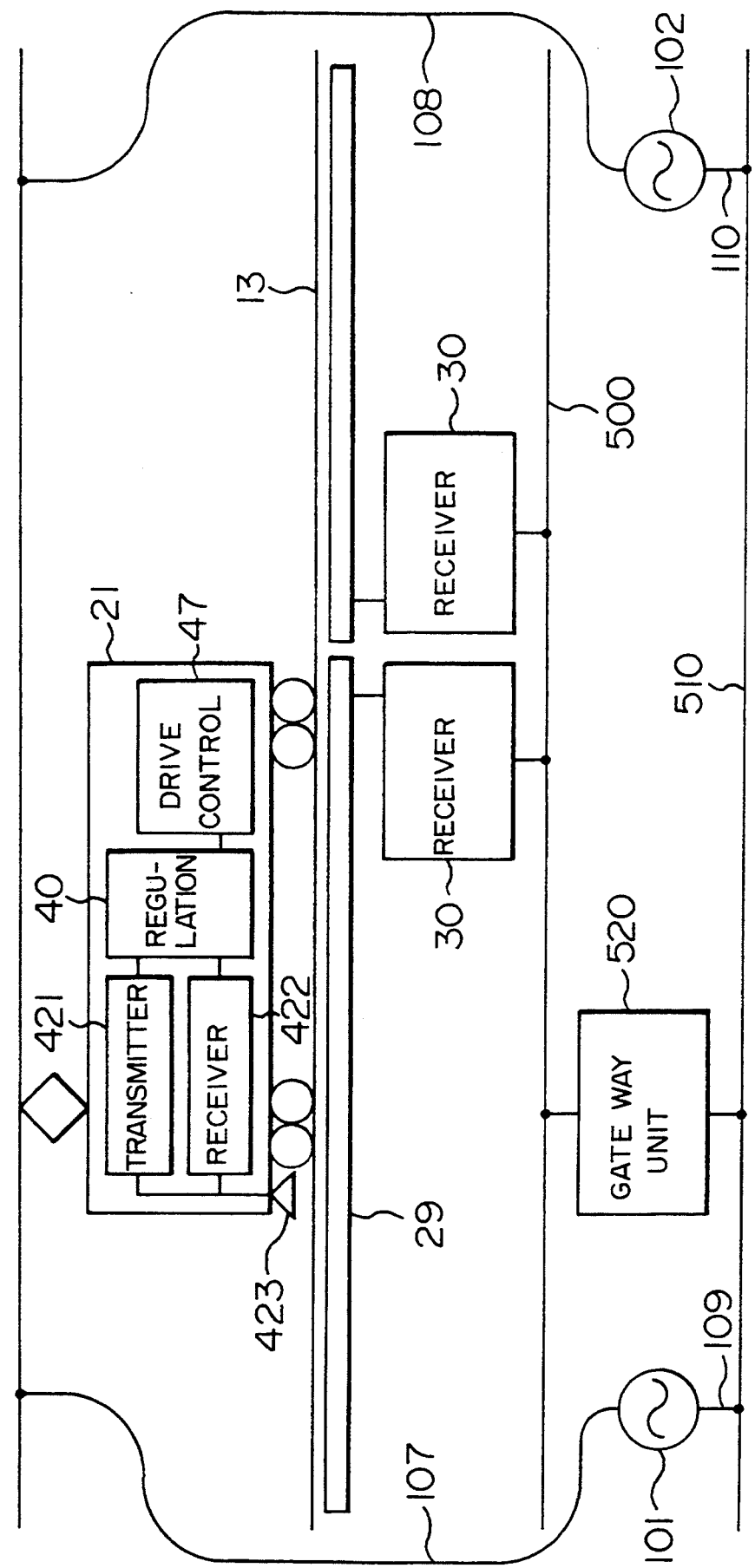
FIG. 16 is a diagram for explanation of a method of communication among trains or among substations and trains.

The polling system is operated in steps of procedure described as follows. In FIG. 16, the transmitter-receiver 30 calls trains located in the electric power supply territory in consecutive order at a constant period, and, when there is information to be delivered to a train, transmits this information together. The call signal has a form of an electric wave, and is received by a receiver 422 in communication means 42 of respective trains. The called train responds to the call, and transmits information from a transmitter 421 through an antenna 423 as an electric wave having a predetermined frequency if any information is available. This information is received by a receiver 30 through the LCX 29.

A token passing system in a LAN 500 can be utilized for communication among transmitter-receivers. This is performed in the steps of procedure described hereunder. The information is delivered to all the transmitter-receivers 30 connected to the LAN 500 as the information having a bit string through the LAN 500 using an optical fiber. At this time, when the information is issued toward anyone of the trains, a measure is taken so as to incorporate the information showing the train identification number into the bit string.

Furthermore, the transmitter-receiver which has received the information communicates with the train group using the polling system again. The steps of procedure are as follows. All of the other transmitter receivers which have received the information from the LAN 500 convert the information into electric waves, and deliver it to the trains travelling in the neighborhood through the LCX 29. The train group receives these information in a general way, but each train disregards the received information when showing a train number addressed to other than the train.

Substation-trains

When a substation communicates with a train group, a gateway unit 520 is made to intervene between the LAN 500 and a LAN 510 for electric power control connecting substation groups 101 and 102 with each other. The token passing system is used for communication between 500 and 520 and between 510 and 520. The steps of procedure are as follows. When the substation transmits command information to trains, the substation delivers the information to the gateway unit 520 using the LAN 510 for electric power control through a cable for communication with the LAN after converting the information into a predetermined form having a bit string. At this time, when the information is issued toward any one of the trains,. a measure is taken to incorporate the information showing the identification number of the train into the bit string. The gateway unit 520 which has received the information issues similar information to all the transmitter-receivers connected to the LAN 500 through the LAN 500. The transmitter-receiver 30 which has received the information calls the trains located in the electric power supply territory in consecutive order at a constant period, and also delivers information together in case the information to be delivered to the train is included. Respective trains receive the information in a general way, but disregard the received information when the information showing the train number other than its own train is included as an address. With the above, it becomes possible for a substation to communicate with a train group or a predetermined train.

Figure 17:
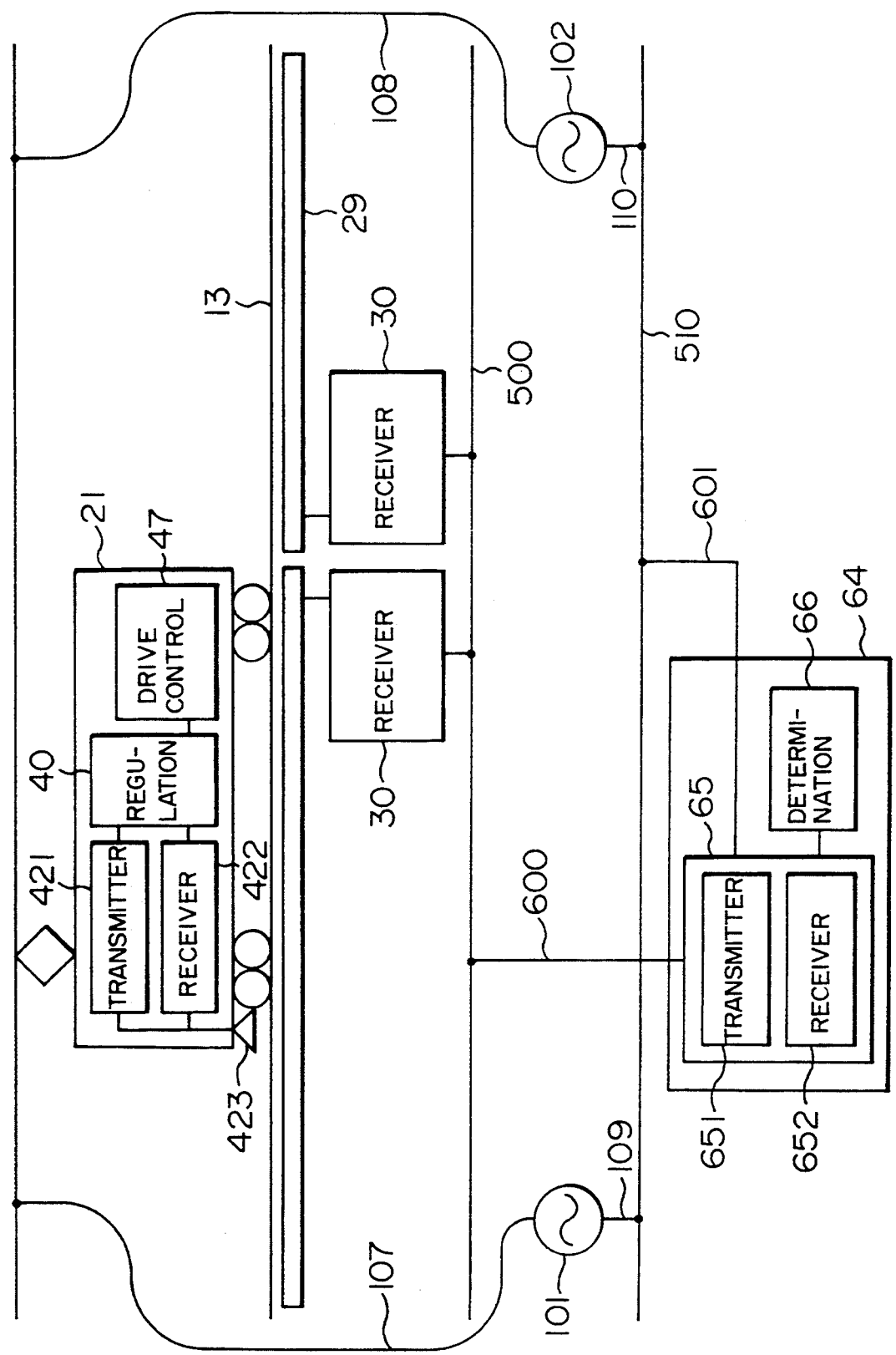
FIG. 17 is a diagram for explanation of a method of communication among trains, substations and operation administration system.

Communication method among trains, substations and operation administration system (FIG. 17).

The steps of procedure of communication among trains and the LAN 500 and among substations and the LAN for electric power control are as described in the above-mentioned paragraphs for train-train and substation-train, respectively, but an operation administration system 64 intervenes between the LAN 500 and the LAN 510. Communication is conducted by using a token passing system between the LANs 500 and 510. The steps of procedure are as follows. The control information issued from a substation connected to the LAN for electric power control is received by a receiver 652 of the operation administration system 64, and the behavior of a train group and the degree of output regulation of a substation group are decided by using determining means 66. The information on the result of decision is issued from a transmitter 651, but this information is transmitted to the LAN 500 through a cable 600 connected to the LAN in case of for a group of train, and is transmitted to the LAN 510 through a cable 601 in case of for a substation.

Further, in the figure, 13 represents a railway track, 21 represents a train, 40 represents regulating means, 47 represents a drive control section, 101 and 102 represent railway substations, 109 to 110 represent communication cables intervening among 101, 102 and 520, 107 and 108 represent feeder wires for supplying electric power to a trolley cable from 101 and 102, 65 represents communication means, 651 represents a transmitter (from the operation administration system to the other facilities on the ground, and 652 represents a receiver (from the other facilities to the operation administration system), respectively.

What is claimed is:

1. A power supply system for a railway, comprising:
   at least one power substation for supplying electric power to a power receiving territory of a railway line, said substation having a function of restraining supply of electric power exceeding a predetermined amount of electric power;
   electric power detection means for detecting when electric power supplied from said substation exceeds said predetermined amount of electric power;
   voltage detection means for detecting the voltages of electric power received at each of a plurality of electric cars operated in said power receiving territory in response to a detection that electric power supplied from said substation exceeds said predetermined amount of electric power; and
   drive force reduction means for selecting at least one of said electric cars to reduce drive force of the selected electric car to reduce drive force of the selected electric car in response to a detection that the voltage of the electric power received at said selected car has fallen below a predetermined voltage.

2. A power supply system according to claim 1, wherein said drive force reduction means includes means for sequentially selecting, as the selected electric car, electric cars which are less time delayed in running in said power receiving territory relative to a preset time schedule.

* * * * *